United States Patent
Fuh et al.

(10) Patent No.: US 7,565,342 B2
(45) Date of Patent: Jul. 21, 2009

(54) DYNAMIC SEMI-JOIN PROCESSING WITH RUNTIME OPTIMIZATION

(75) Inventors: You-Chin Fuh, San Jose, CA (US); Fen-Ling Lin, San Jose, CA (US); Andrei Fedorovich Lurie, San Jose, CA (US); Terence Patrick Purcell, New Berlin, IL (US); Yoichi Tsuji, San Jose, CA (US); Li Xia, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 381 days.

(21) Appl. No.: 11/222,886

(22) Filed: Sep. 9, 2005

(65) Prior Publication Data

US 2007/0061288 A1    Mar. 15, 2007

(51) Int. Cl.
*G06F 17/30* (2006.01)

(52) U.S. Cl. .................... 707/2; 707/3; 707/4

(58) Field of Classification Search .......... 707/2, 707/3, 4, 102, 7
See application file for complete search history.

(56) References Cited

U.S. PATENT DOCUMENTS

| | | | | |
|---|---|---|---|---|
| 5,345,585 A * | 9/1994 | Iyer et al. | ....................... | 707/2 |
| 5,666,528 A | 9/1997 | Thai | | |
| 5,706,495 A | 1/1998 | Chadha et al. | | |
| 6,138,111 A * | 10/2000 | Krishna | ....................... | 707/2 |
| 6,438,542 B1 * | 8/2002 | Koo et al. | ....................... | 707/4 |
| 6,502,089 B1 * | 12/2002 | Amundsen et al. | ............. | 707/2 |
| 6,772,169 B2 * | 8/2004 | Kaplan | ....................... | 707/102 |
| 7,233,939 B1 * | 6/2007 | Ziauddin | ....................... | 707/2 |
| 2002/0002550 A1 * | 1/2002 | Berman | ....................... | 707/3 |
| 2004/0210563 A1 * | 10/2004 | Zait et al. | ....................... | 707/3 |
| 2004/0220940 A1 | 11/2004 | Berks et al. | | |
| 2006/0259478 A1 * | 11/2006 | Martin et al. | .................. | 707/3 |

OTHER PUBLICATIONS

Gennady Antoshenkov, Mohamed Ziauddin, Query Processin and optimization in Oracle Rdb, 1996, teh VLDB Journal, pp. 231-236.*
F. Najjar and Y. Slimani, The Enhancement of Semijoin Strategies in Distributed Query Optimization, 1998, 529-533.*
Konrad Stocker, Integrating Semi-Join-Reducers into State-of-the-Art Query Processors, 2001, 575-584.*
Jo-Mei Chang, A Heuristic Approach to Distributed Query Processing, Sep. 1982, pp. 54-61.*
Antoshenkov, G. & M. Ziauddin, "Query Processing and Optimization in Oracle Rdb", *The VLDB Journal*, 1996, 5, pp. 229-237.

(Continued)

*Primary Examiner*—John R. Cottingham
*Assistant Examiner*—Sherief Badawi
(74) *Attorney, Agent, or Firm*—Janaki K. Davda; Konrad Raynes & Victor LLP (57) ABSTRACT

Provided are a techniques for processing a query including semi-joins. At execution time, a next semi-join is selected from the semi-joins for execution in a current round of semi-join executions. A reporting threshold is determined that indicates a number of record-identifiers to be retrieved for the determined semi-join. The selected semi-join is executed until the determined number of record identifiers are retrieved.

21 Claims, 6 Drawing Sheets

OTHER PUBLICATIONS

Pirahesh, H., C. Mohan, J. Cheung, T.S. Liu, & P. Sellinger, "Parallelism in Relational Data Base Systems: Architectural Issues and Design Approaches", *Processing of the Second International Symposium on Databases in Parallel and Distributed Systems*, 1990, pp. 4-29.

Zhang, Z. & W. Perrizo, "Distributed Query Processing Using Active Networks", *Proceedings of the 2000 ACM Symposium on Applied Computing*, Mar. 2000, pp. 374-380.

Lei, F., Y. Zou, and F. Zeng, "Intelligent Multi-machine Scheduling on Tasks with Variable Switch Time", Fifth World Congress on Intelligent Control and Automation, 2004, vol. 4, pp. 2958-2961. (Abstract).

Regehr, J., "Scheduling Tasks with Mixed Preemption Relations for Robustness to Timing Faults", In Proceedings of the 23rd IEEE Real-Time Systems Symposium, Dec. 2002, pp. 315-326.

* cited by examiner

DYNAMIC SEMI-JOIN PROCESSING WITH RUNTIME OPTIMIZATION

BACKGROUND

1. Field

Embodiments of the invention relate to dynamic semi-join processing with runtime optimization.

2. Description of the Related Art

Relational DataBase Management System (RDBMS) software uses relational techniques for storing and retrieving data in a relational database. Relational databases are computerized information storage and retrieval systems. Relational databases are organized into tables that consist of rows and columns of data. The rows may be called tuples or records or rows. A database typically has many tables, and each table typically has multiple records and multiple columns. A RDBMS may use a Structured Query Language (SQL) interface.

A table in a database may be accessed using an index. An index is an ordered set of references (e.g., pointers) to the records in the table. The index is used to access each record in the table using a key (i.e., one of the fields or attributes of the record, which corresponds to a column). The term "key" may also be referred to as "index key". Without an index, finding a record requires a scan (e.g., linearly) of an entire table. Indexes provide an alternate technique to accessing data in a table. Users may create indexes on a table after the table is built. An index is based on one or more columns of the table.

A query may be described as a request for information from a database based on specific conditions. A query typically includes one or more predicates. A predicate may be described as an element of a search condition that expresses or implies a comparison operation (e.g., A=3).

When a query is received by the RDBMS, the query specifies the data that the user wants, but not how to get to it. When the query is received, during a prepare phase, the RDBMS converts the query into an executable form. During a bind phase, the RDBMS determines access paths to the data to be retrieved by a query that describe how the data should be retrieved. Then, the RDBMS executes the query.

ANDing refers to an AND operation that combines record identifiers (RIDS). An AND operation between two operands may be described as a Boolean operation whose result has the Boolean value 1 if and only if each operand has the Boolean value 1. Index ANDing refers to a technique of processing a query by breaking the retrieval of a result set of record identifiers (RIDS) stored in an index into several operations, which may be referred to as semi-joins, and combining the result sets with AND operations. Similarly, ORing refers to an OR operation that combines RIDS. An OR operation between two operands may be described as a Boolean operation whose result has the Boolean value 1 if either operand has the Boolean value 1. Index ORing refers to processing a query by breaking the retrieval of a result set of record identifiers (RIDS) stored in an index into several operations, which may be referred to as semi-joins, and combining the result sets with OR operations. A join may be described as an SQL relational operation that allows retrieval of data from two or more tables based on matching column values. A semi-join may be described as a partial join in which access occurs from an outer table or index to an index of the inner table. Access to the inner table itself is deferred. A star join is a type of join used to process tables which form a star schema data model. The star schema data model contains a central fact table surrounded by multiple dimension tables, each joined to the central table representing a star-like pattern. In one example, the outer table of a semi-join is a dimension table and the inner table is the fact table. In this example, there may be multiple dimensions, each semi-joined to separate indexes of the inner fact table. Each semi-join accesses an index to retrieve RIDs that match one or more join predicates from the dimensions. The result of a semi-join is a list of all fact table RIDs that match the one or more join predicates. The resulting RIDs from all semi-joins are then ANDed (i.e., intersected) to produce a final RID list. The final RID list is then used to retrieve rows from the fact table.

With conventional index ANDing implementations, the order of ANDing the semi-join results is determined during the prepare or bind phases and stays fixed at execution time. It is possible that the order is not optimal or that one or more semi-joins provides poor selectivity.

For example, the following query (1) is a star join query with three dimension tables D1, D2, D3 and a fact table F. Query (1) selects a value from column C1 from a row in the fact table F when the value of column C1 in dimension table D1 equals the value of column C1 in the fact table, the value of column C2 in dimension table D2 equals the value of column C2 in the fact table, and the value of column C3 in dimension table D3 equals the value of column C3 in the fact table. Thus, for query (1), each dimension table is joined with the fact table as specified in the WHERE clause.

SELECT F.C1 FROM D1, D2, D3, F WHERE
   D1.C1=F.C1 AND D2.C2=F.C2 AND
   D3.C3=F.C3;                                                    Query (1)

Figure 1:
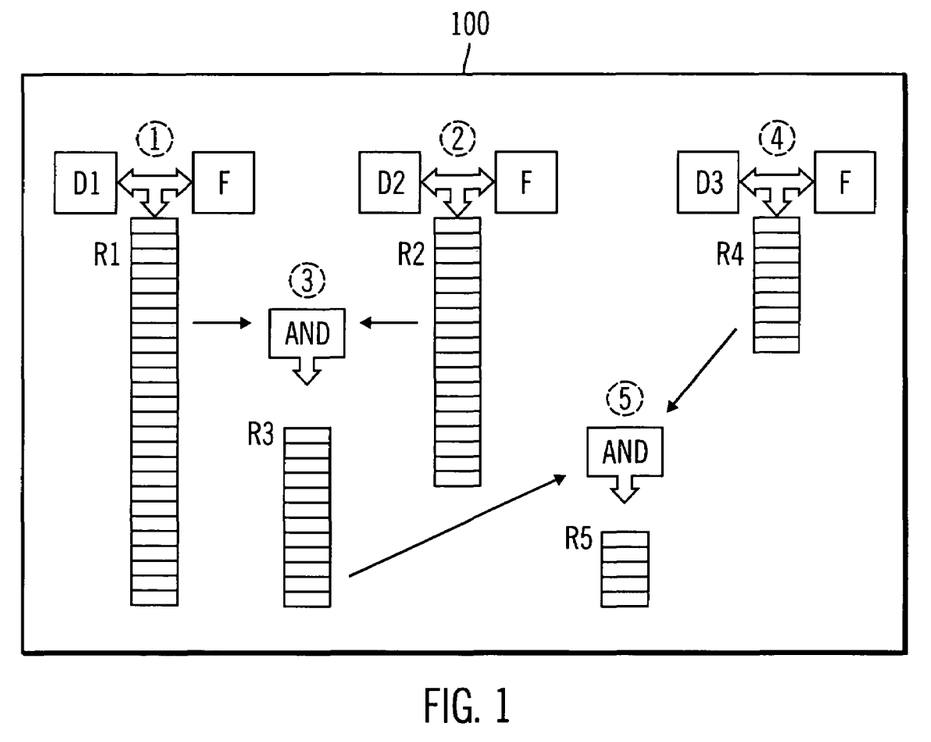
FIG. 1 illustrates structures showing the semi-join ANDing order of this example.

A query optimizer of the RDBMS may determine the following semi-join ANDing operation order during the prepare or bind phase, and this operation order is executed sequentially at execution time. FIG. 1 illustrates structures 100 showing the semi-join ANDing order (1) of this example.

Order (1)

1) R1=D1->F (result R1 is the result of semi-joining dimension table D1 with fact table F)
2) R2=D2->F (result R2 is the result of semi-joining dimension table D2 with fact table F)
3) R3=R1 AND R2 (result R3 is the result of ANDing result R1 and result R2)
4) R4=D3->F (result R4 is the result of semi-joining dimension table D3 with fact table F)
5) R5=R3 AND R4 (result R5 is the result of ANDing result R3 and result R4)

It is possible that at the execution time, result R1 yields a very large result set due to its poor selectivity. So processing the semi-join of dimension table D3 with the fact table F first and processing the semi-join of dimension table D2 with the fact table F second would have provided better performance (since ANDing result R2 and result R4 results in a smaller intermediate RID list than the RID list of ANDing result R1 and result R2 in this example). Moreover, it is possible that the computation of result R1 may run out memory for storing the RIDs before computation of result R2 and result R4 get a chance to complete.

Thus, there is a need in the art for improved processing of queries with semi-joins.

SUMMARY OF EMBODIMENTS OF THE INVENTION

Provided are a method, computer program product, and system for processing a query including semi-joins. At execution time, a next semi-join is selected from the semi-joins for execution in a current round of semi-join executions. A reporting threshold is determined that indicates a number of record-identifiers to be retrieved for the determined semi-join. The selected semi-join is executed until the determined number of record identifiers are retrieved.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

Embodiments improve the performance of semi-join ANDing and ORing when retrieving data (e.g., RIDs) using an index. Embodiments eliminate the predetermined fixed ANDing or ORing order and introduce dynamic ANDing or ORing with runtime optimizations. With certain embodiments, executing semi-joins is performed in a dynamic way, with each semi-join being processed until a given number of RIDs are retrieved and ANDing or ORing the most selective semi-joins as soon as the corresponding semijoins are completed. Also, both the number of RIDs to be retrieved for each semi-join and the ordering of execution of the semi-joins is determined dynamically.

Embodiments provide early termination of poorly selective semi-joins, thus, terminating all ANDing or ORing operations early if the accumulated selectivity is good enough that ANDing or ORing the remaining semi-joins may not provide better selectivity. In other words, this termination occurs when there is a small enough set of RIDs that it is better to stop all ANDing or ORing and start fetching rows from the fact table using the set of RIDs. Moreover, embodiments terminate or temporarily suspend particular semi-joins that are not selective enough to justify the preparation cost for ANDing or ORing. Moreover, embodiments suspend processing of poorly selective semi-joins to enable other semi-joins to be completely executed. Each semi-join may also be referred to as a "leg."

Although examples may describe pair-wise ANDing for a star join, embodiments are applicable for any index ORing or ANDing (e.g., in multiple index access for a single table, IN list processing (where IN is a type of a predicate (e.g., WHERE C1 IN (1,2,3) OR C2 NOT IN ('A', 'B', 'C')), etc.), subqueries, and joins involving multiple tables or nested queries.

Figure 2:
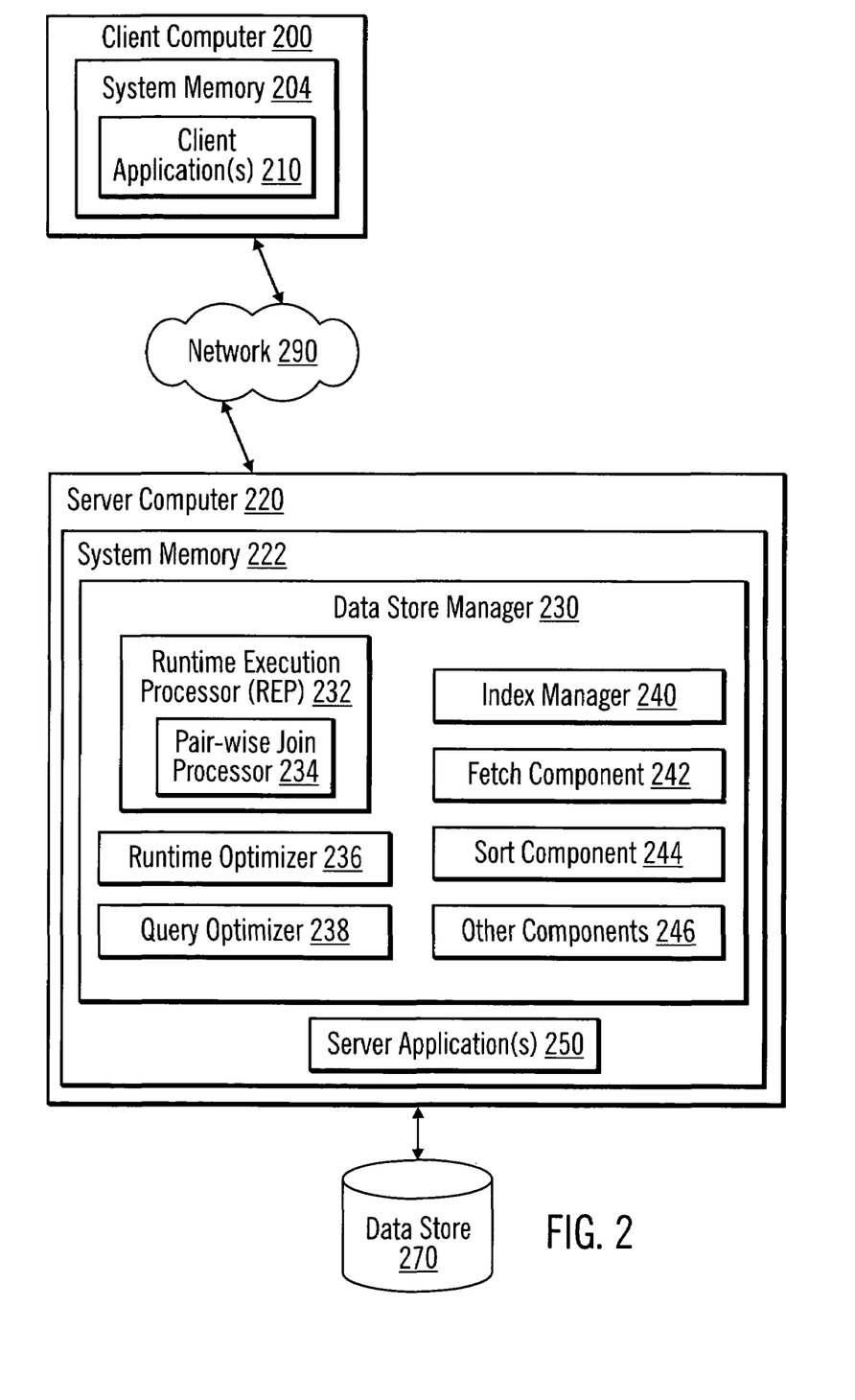
FIG. 2 illustrates details of a computing device in accordance with certain embodiments.

FIG. 2 illustrates details of a computing device in accordance with certain embodiments. A client computer 200 is connected via a network 290 to a server computer 220. The client computer 200 includes system memory 204, which may be implemented in volatile and/or non-volatile devices.

One or more client applications 210 (i.e., computer programs) are stored in the system memory 204 for execution by a processor (e.g., a Central Processing Unit (CPU)) (not shown).

The server computer 220 includes system memory 222, which may be implemented in volatile and/or non-volatile devices. System memory 222 stores a data store manager 230 (e.g., a Relational DataBase Management System (RDBMS)) and one or more server applications 250. The data store manager 230 includes a runtime execution processor 232, a runtime optimizer 236, a query optimizer 238, an index manager 240, a fetch component 242, a sort component 244, and one or more other components 246. The runtime execution processor 232 includes a pair-wise join runtime processor 234. The runtime execution processor 232 and the runtime optimizer 236 enable dynamic semi-join ANDing and ORing with runtime optimization. These computer programs that are stored in system memory 222 are executed by a processor (e.g., a Central Processing Unit (CPU)) (not shown). The server computer 220 provides the client computer 200 with access to data in a data store 270.

The components of the data store manager 230 support the functions of query languages (e.g., SQL), such as definition, access control, interpretation, compilation, data retrieval, and update of user and system data.

In alternative embodiments, the computer programs may be implemented as hardware, software, or a combination of hardware and software.

The client computer 200 and server computer 220 may comprise any computing device known in the art, such as a server, mainframe, workstation, personal computer, hand held computer, laptop telephony device, network appliance, etc.

The network 290 may comprise any type of network, such as, for example, a Storage Area Network (SAN), a Local Area Network (LAN), Wide Area Network (WAN), the Internet, an Intranet, etc.

The data store 270 may comprise an array of storage devices, such as Direct Access Storage Devices (DASDs), Just a Bunch of Disks (JBOD), Redundant Array of Independent Disks (RAID), virtualization device, etc.

Figure 3:
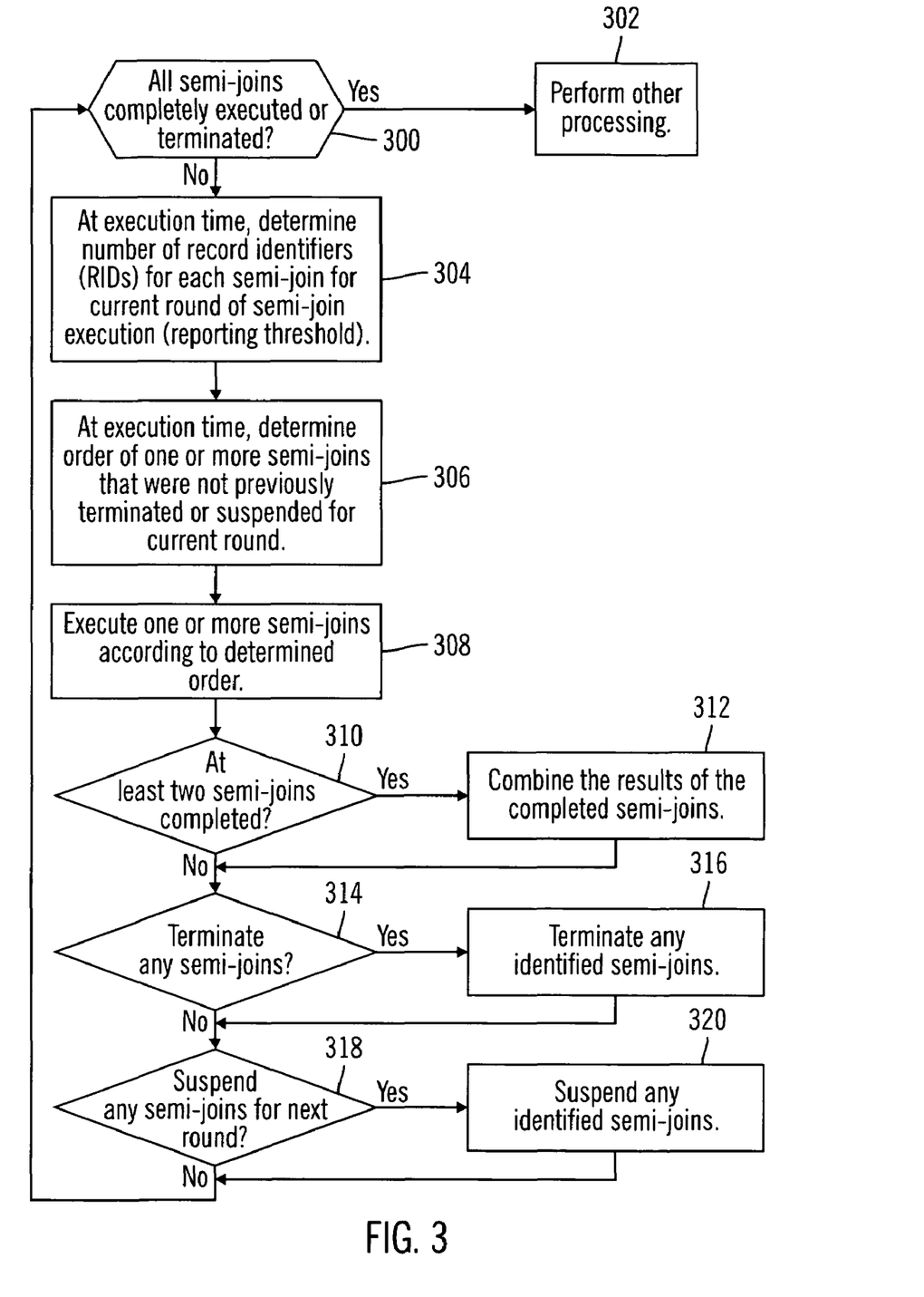
FIG. 3 illustrates logic performed in accordance with certain embodiments.

FIG. 3 illustrates logic performed in accordance with certain embodiments. Control begins in block 300 with a runtime execution processor (REP) 232 determining whether all semi-joins have been completely executed or terminated. If all semi-joins have been completed or terminated, then processing continues to block 302, otherwise, processing continues to block 304. In block 302, the runtime execution processor 233 performs other processing. In block 304, at execution time, the runtime execution processor 233 determines a number of RIDs for each semi-join for the current round of semi-join execution, and this number may also be referred to as a reporting threshold.

The number of RIDs at which the processing of a current semi-join will stop may be referred to as a reporting threshold. In certain embodiments, the reporting threshold is selected to prevent frequent switches between semi-join tasks (i.e., the reporting threshold is not too small) and/or to prevent poorly selective semi-joins to run for a long time (i.e., the reporting threshold is not too high). A poorly selective semi-join may be described as one that retrieves a very high percentage of the total fact table RIDs (i.e., many RIDs are evaluated to obtain the reporting threshold number of RIDs). For example, if a semi-join retrieves 100% of the fact (inner) table rows, then the semi-join may be described as not selective. If the semi-join retrieves 1% of the fact (inner) table rows, then the semi-join may be described as very selective.

Various techniques may be used to select the reporting threshold. One technique for selecting the reporting threshold is to pick a number based on a portion of the RID storage pool size and the number of semi-joins (e.g. (75% of the RID pool size)/(number of semi-joins)*(size of one RID)). Another technique for selecting the reporting threshold is to use the query optimizer 238 to determine a number (e.g., by using a formula involving the cardinality of the fact table, cardinality of the dimension table, etc., where cardinality may be described as a number of rows in a table). Yet another technique for selecting the reporting threshold is to allow a system administrator or other user to pick a number (e.g. 1000 RIDs).

In certain embodiments, once the reporting threshold is selected, the same reporting threshold is used for each round of semi-join processing. In certain alternative embodiments, the reporting threshold may be different for each semi-join and may change for each semi-join between sequential executions of that semi-join (e.g., the reporting threshold for a first semi-join may be set to 1000 RIDs for round 1, may be set to 5000 RIDs for a second round, may be set to 500 RIDs for a third round, etc.).

In block 306, at execution time, the runtime execution processor 233 determines an order of one or more semi-joins that were not previously terminated or suspended for the current round of semi-join execution. The runtime execution processor 233 may determine the ordering based on heuristic rules that may involve statistics generated from semi-join executions. For example, at prepare and/or bind time, an optimizer 238 may determine the number of expected RIDs fetched per join predicate value or the number of total fact table RIDs fetched for a given semi-join. The runtime execution processor 232 may then review a statistics report from each semi-join execution to see which one was closest to meeting the expectations of the query optimizer 238 and select that semi-join to be processed next.

In block 308, the pair-wise join runtime processor 234 executes the one or more semi-joins until the determined number of RIDs have been fetched for each executed semi-join according to the order determined by the runtime execution processor 233. Thus, the pair-wise join runtime processor 234 stops processing a given semi-join after having retrieved a certain number of RIDs, and then, the pair-wise join runtime processor 234 processes the next semi-join.

Thus, in certain embodiments, the runtime execution processor 232 determines a new reporting threshold for all semi-joins, and the pair-wise join runtime processor 234 executes each semi-join until the number of fetched RIDs matches the reporting threshold for that semi-join. Then the pair-wise join runtime processor 234 returns control back to the runtime execution processor 232.

In block 310, the runtime execution processor 232 determines whether at least two semi-joins have completed. If so, processing continues to block 312, otherwise, processing continues to block 314. In block 312, the results of the completed semi-joins are combined (e.g., ANDed or ORed) by the sort component 244, and processing continues to block 314.

Embodiments provide dynamic index ANDing and ORing to eliminate the dependency on semi-join order chosen by the query optimizer 238 and also provide additional optimization techniques including early termination of poorly selective semi-joins and suspension of poorly selective semi-joins.

In block 314, the runtime execution processor 232 determines whether any semi-joins are to be terminated. If so, processing continues to block 316, otherwise, processing continues to block 318. In block 316, certain identified semi-joins are terminated. In certain embodiments, particular semi-joins are terminated. In certain embodiments, all semi-joins that have not been completely executed may be terminated. That is, embodiments terminate expensive, poorly selective semi-joins early. To perform early termination, certain embodiments keep track of the size of an intermediate RID list. An intermediate RID list may be described as any RID list that is generated while processing a query and that is not a final RID list (e.g., an intermediate RID list is generated after ANDing two other intermediate RID lists from executed semi-joins). If, at some point, the intermediate RID list size is small enough, the runtime execution processor 232 may terminate all unfinished semijoins that are in progress and just use the intermediate RID list as the final RID list. Once there is a small enough RID list with which to access a table, chances are that the final RID list will not be much smaller, and embodiments avoid using additional processing time and resources needed to complete all remaining semi-joins.

In block 318, the runtime execution processor 232 determines whether any semi-joins should be suspended for a next round of semi-join executions. If so, processing continues to block 320, otherwise, processing loops back to block 300. In block 320, the runtime execution processor 232 suspends identified semi-joins. In embodiments, the runtime optimizer 236 uses the index manager 240 to estimate the number of RIDs that may be returned from a given semi-join. In this manner, the runtime execution processor 232 makes educated decisions as to which semi-join to process next. For example, if it is estimated that a certain semi-join is expected to retrieve a large number of RIDs, that semi-join may be suspended.

Figure 4:
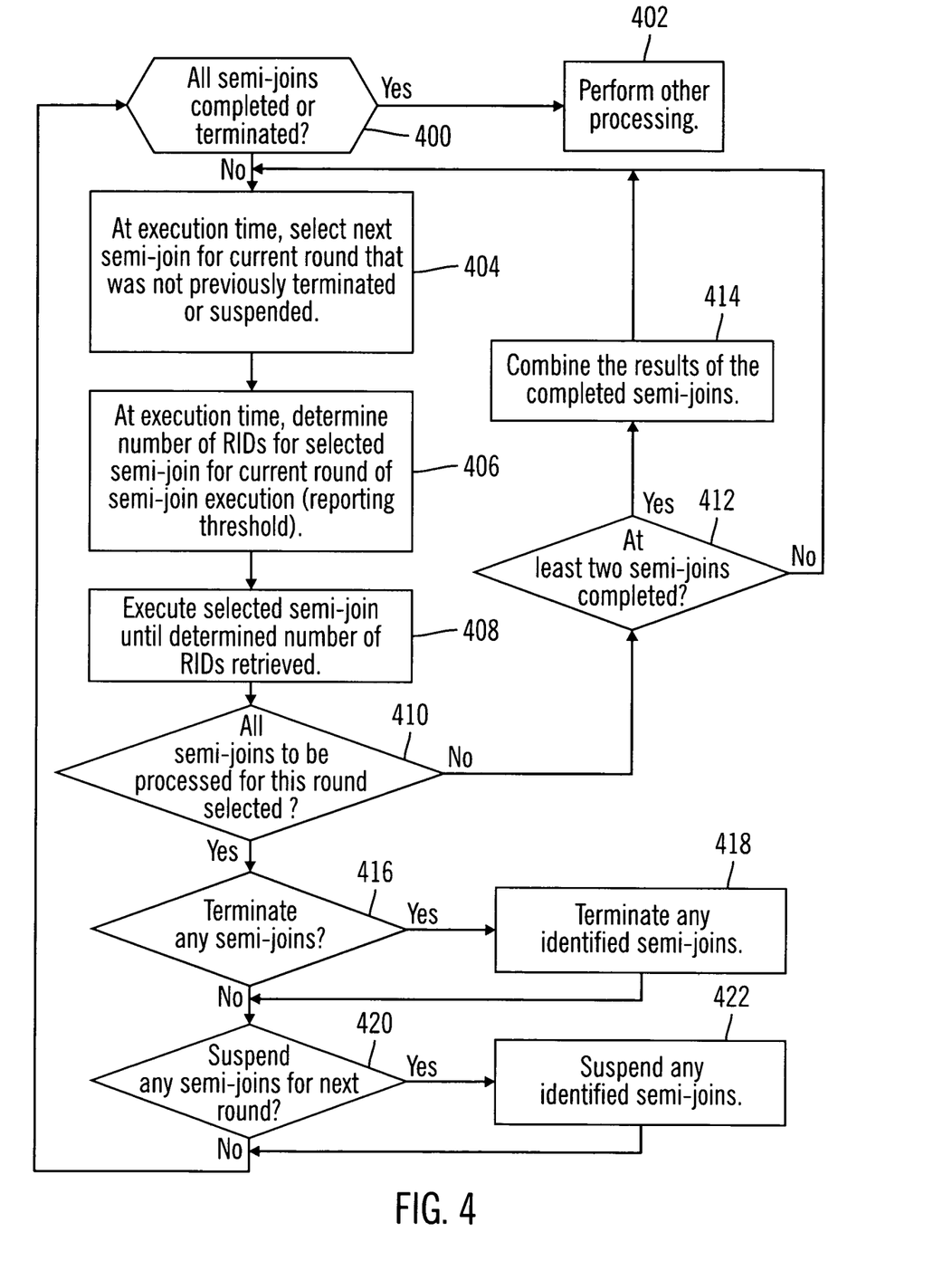
FIG. 4 illustrates logic performed in accordance with certain alternative embodiments.

FIG. 4 illustrates logic performed in accordance with certain alternative embodiments. Control begins in block 400 with the runtime execution processor 232 determining whether all semi-joins have been completely executed or terminated. If all semi-joins have been completed or terminated, then processing continues to block 402, otherwise, processing continues to block 304. In block 402, the runtime execution processor 232 performs other processing.

In block 404, at execution time, the runtime execution processor 232 selects a next semi-join to be executed for a current round that was not previously terminated or suspended. In block 406, at execution time, the runtime execution processor 232 determines a number of RIDs for the selected semi-join for the current round of semi-join execution, and this number may also be referred to as a reporting threshold. In block 408, the pair-wise join runtime processor 234 executes the selected semi-join until the determined number of RIDs have been retrieved.

Thus, in certain embodiments, the pair-wise join runtime processor 234 stops processing of a current semi-join upon reaching the reporting threshold and returns control to a runtime execution processor (REP). This allows the runtime execution processor 232 to have a greater control over each semi-join processing and allows for a dynamic scheduling of the semi-joins with the runtime execution processor 232 determining which semi-join to process next.

Thus, in certain embodiments, the runtime execution processor 232 selects a semi-join for processing, and determines a new reporting threshold for that semi-join. Then, the pair-wise join runtime processor 234 executes each semi-join until the number of fetched RIDs matches the reporting threshold for that semi-join and returns control back to the runtime execution processor 232. The runtime execution processor 232 determines which semi-joins to terminate or suspend and which semi-join to run next. In certain embodiments, with the processing of FIG. 4, the reporting threshold is the same for each semi-join executed in one round of semi-join executions.

In block 410, the runtime execution processor 232 determines whether all semi-joins to be processed for this round have been selected. If not, processing continues to block 412, otherwise, processing continues to block 416. In block 412, the runtime execution processor 232 determines whether at least two semi-joins have completed. If so, processing continues to block 414, otherwise, processing loops back to block 404. In block 414, the results of the completed semi-joins are combined (e.g., ANDed or ORed) by the sort component 244, and processing loops back to block 404.

In block 416, the runtime execution processor 232 determines whether any semi-joins are to be terminated. If so, processing continues to block 418, otherwise, processing continues to block 420. In block 418, certain identified semi-joins are terminated. In certain embodiments, particular semi-joins are terminated. In certain embodiments, all semi-joins that have not been completely executed may be terminated. In block 420, the runtime execution processor 232 determines whether any semi-joins should be suspended for a next round of semi-join executions. If so, processing continues to block 422, otherwise, processing loops back to block 400. In block 422, the runtime execution processor 232 suspends identified semi-joins.

Merely for illustration, an example is provided. In the example, with reference to query (1), when a query execution plan for query (1) is prepared, the query optimizer 238 may determine the following ANDing order (2):

Order (2)
1) semi-join D1->F, save result RID list in result R1
2) semi-join D2->F, save result RID list in result R2
3) AND result R1 and result R2, save result in result R3
4) semi-join D3->F, save result RID list in result R4
5) AND result R3 and result R4, save result in result R5

With certain embodiments, semi-joins 1, 2, and 4 are processed in a loop until one of the semi-joins has been completed. Then, the remaining two semi-joins are processed in a loop until one of the semi-joins has been completed. Then, the remaining semi-join is processed until completion. In certain embodiments, parallelism is available, and, in such embodiments, if parallelism is used to run the query, then semi-joins 1, 2, and 4 may execute in parallel.

With certain embodiments, the semi-join that results in the smallest RID list is expected to complete first (assuming that the sizes of the dimension tables are relatively close and are much smaller than the size of the fact table). The semi-join with the next smallest RID list result is expected to complete next, and so on, with the semi-join that results in the biggest RID list completing last. Thus, unlike conventional implementations, the semi-joins are not completed according to the predetermined order chosen by the query optimizer 238. Embodiments achieve independent execution of the semi-joins without the use of parallelism.

With certain embodiments, the runtime execution processor 232 is provided with the capability to control the scheduling of the semi-joins. In embodiments, each semi-join may be partly processed, and thus, is treated equally among all semi-joins. This eliminates the performance dependency on the order chosen by the query optimizer 238, and allows the runtime execution processor 232 to process the semi-joins in any order.

For example, with reference to query (1), assume that there are 80,000 rows that match the "D1.C1=F.C1" predicate, 60,000 rows that match the "D2.C2=F.C2" predicate, and 20,000 rows that match the "D3.C3=F.C3" predicate. Execution of the query in accordance with certain embodiments may be:
1) Determine an appropriate reporting threshold value based on the RID pool size and the number of semi-joins. For example, a simplified formula, such as (Threshold=(RID pool size/2)/# of semi-joins*RID size) may be used to determine the reporting threshold. For this example, it is assumed that the reporting threshold is 30,000.
2) Process semi-join D1->F (#1) up to the reporting threshold. This retrieves first 30,000 RIDs.
3) Process semi-join D2->F (#2) up to the reporting threshold. This retrieves first 30,000 RIDs
4) Process semi-join D3->F (#3) up to the reporting threshold. This retrieves all 20,000 RIDs, and semi-join #3 is completed.
5) Process semijoin #1 up to the reporting threshold. This retrieves next 30,000 RIDs
6) Process semi-join #2 up to the reporting threshold. This retrieves next 30,000 RIDs and semi-join #2 is completed.
7) AND result of semi-join #3 and result of semi-join #2. That is, 20,000 RIDs are ANDed with 60,000 RIDs, producing at most 20,000 RIDs.
8) Process semi-join #1 up to the reporting threshold. This retrieves 20,000 RIDs, and semi-join #1 is completed.
9) AND result of task 7 with result of semi-join #1. That is, at most 20,000 RIDs are ANDed with 80,000 RIDs, producing at most 20,000 RIDs.

In embodiments in which the semi-join order, determined by the query optimizer 238, is directly opposite to an optimal order, dynamic index ANDing provides a large performance improvement. For example, embodiments provide a large performance improvement in cases in which the first semi-join returns the most RIDs, and the last semi-join returns the fewest RIDs. In certain embodiments, the higher the number of semi-joins, the higher the number of orderings in which dynamic index ANDing provides large performance improvement with respect to conventional systems.

Embodiments also provide early termination of poorly selective semi-joins. For example, with reference to query (1) and order (2), if the semi-join D3->F and the semi-join D2->F completed, and, after the ANDing of result R2 and result R4, the resulting RID list size is just 10 RIDs, embodiments may terminate the semi-join D1->F and use the 10 RIDs to fetch from the fact table, while reapplying the join predicates, to obtain a final result. This improves the performance when the terminated semi-joins would result in a relatively large RID list. In the example with reference to order (2), the semi-join D1->F produces the largest RID list, so when this semi-join is terminated, embodiments avoid fetching all the RIDs for semi-join D1->F. Also, even if the ANDing of results of semi-join D1->F with the 10 RIDs result produces an empty RID list (i.e., smallest possible result because none of the rows qualify for the join), it is still faster to fetch 10 fact table rows and apply join predicates than to wait for completion of the semi-join D1->F and then perform ANDing.

Embodiments provide suspension of poorly selective semi-joins. With reference to query (1) and order (2), all three semi-joins are processed up to the reporting threshold once. Then, the runtime execution processor 232 may invoke the index manager 240 to estimate the number of RIDs that may be returned for each semi-join. Assuming that the index manager indicates a large number for the semi-join D1->F, the runtime execution processor 232 may temporarily suspend the processing of the semi-join D1->F and concentrate on finishing the semi-joins D2->F and D3->F first.

Embodiments provide a runtime execution processor 232 that controls the scheduling of semi-joins. The runtime execution processor 232 is able to estimate the RID list size of each semi-join and improves management of the RID pool by allowing semi-joins to be suspended. For example, if one of the semi-joins is estimated to return a large RID list, then the runtime execution processor 232 may temporarily suspend execution of this semi-join to allow other semi-joins to complete with less competition for the RID pool.

In certain embodiments, the runtime execution processor 232 may suspend poorly selective semi-joins even using the execution order provided by the query optimizer 238.

Figure 5:
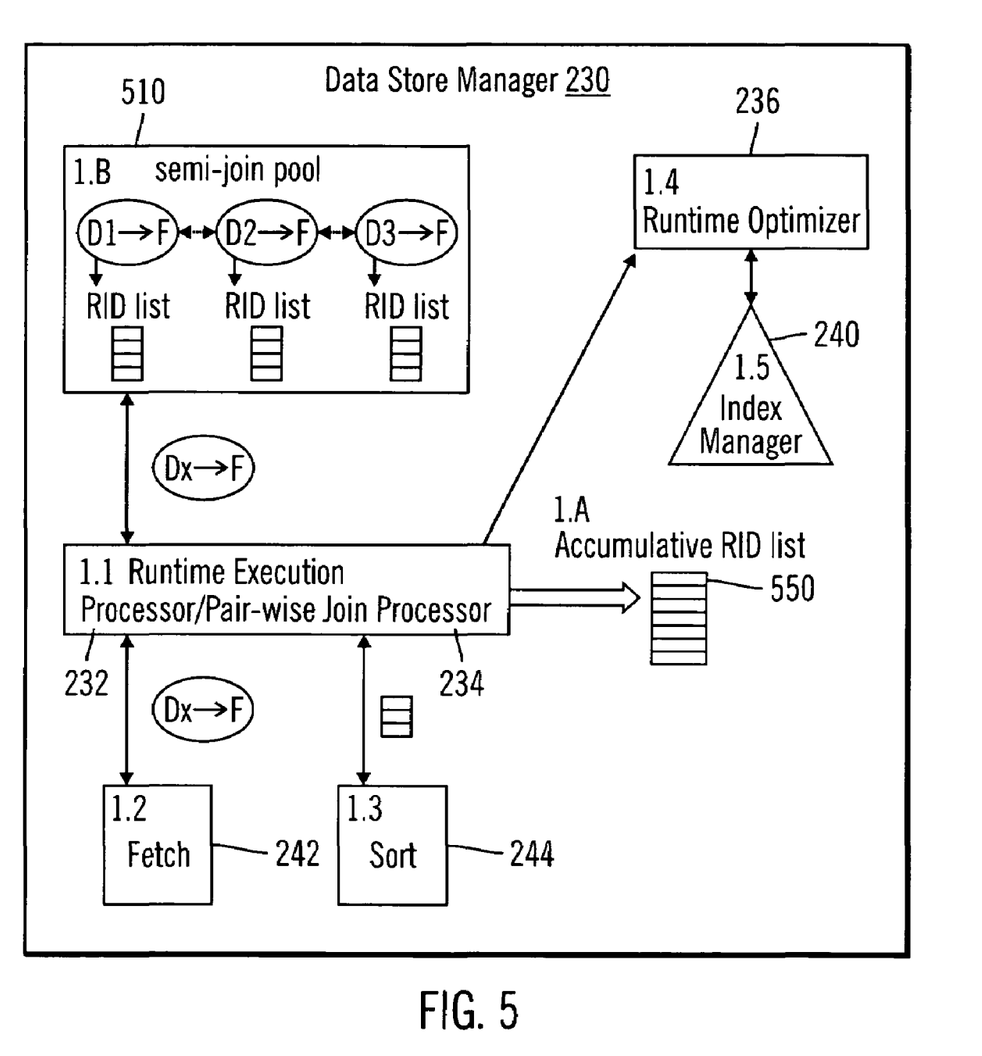
FIG. 5 illustrates details of a data store manager in accordance with certain embodiments.

FIG. 5 illustrates details of a data store manager 230 in accordance with certain embodiments. In FIG. 5, there is a semi-join pool 514. The data store manager 230 includes runtime execution processor 232, a pair-wise join runtime processor 234, and a runtime optimizer 236 that work with other components (e.g., an index manager 240, a fetch component 242, and a sort component 244).

The pair-wise join runtime processor 234 selects a semi-join from the semi-join pool 514 based on the ordering determined by the runtime execution processor 232. The pair-wise join runtime processor 234 invokes a fetch component 242 to process the semi-join by fetching RIDs. The pair-wise join runtime processor 234 invokes a sort component 244 to sort and to intersect RID lists (i.e., to perform ANDing).

The runtime execution processor 232 invokes the runtime optimizer 236 to provide optimization information. The runtime optimizer 236 makes educated optimization decisions for setting a new reporting threshold and picking the next semi-join to be processed. The decisions may be said to be "educated" because they are based on certain statistics that are reported from each semi-join execution and based on certain heuristic rules. The runtime optimizer 236 may invoke other components. For example, the runtime optimizer 236 may invoke the index manager 540 to estimate the number of RIDs for a certain semi-join. In, certain embodiments the number of RIDS may be estimated based on a number of leaf pages scanned and an average number of index keys per page. This may be computed efficiently by counting the child pages in the parent of leaf pages. For example, this operation may be performed when the total number of accumulated RIDs exceeds the original bind time estimate, when another semi-join has completed, due to RID storage limitations or when a calculated or parameterized threshold is exceeded.

The runtime optimizer 236 also uses available system resources information (e.g. current RID pool size, number of active semi-joins, etc) to provide optimization information to the runtime execution processor 232. The current RID pool size may be described as the amount of storage available for storing RIDs while processing a query. The number of active semi-joins may be described as the number of semi-joins that have not completed processing.

The runtime execution processor 232 executes the semi-joins in a dynamic scheduling fashion by making an educated decision in choosing which semi-join to process. The runtime execution processor 232 may invoke the runtime optimizer 236 to determine the optimal number of RIDs for each fetch (reporting threshold) or to help decide which semi-join is to be processed. Once a semi-join is chosen, the fetch component 242 is invoked by the pair-wise join processor 234 to process that semi-join. When the semi-join has either completed (e.g., the dimension-to-fact semi-join is finished and the resulting RID list is available) or has processed the number of RIDs equal to the reporting threshold, the fetch component 242 processing stops and control is returned back to the pair-wise join runtime processor 234. If the semi-join that was just processed is not completed, the pair-wise join runtime processor 234 returns the semi-join to the unprocessed semi-join pool 510 and chooses the next semi-join to be processed. If the semi-join that was just processed is completed, the pair-wise join runtime processor 234 invokes the sort component 244 to sort the result RID list, and, if this is the first semi-join that has completed, the pair-wise join runtime processor 234 saves the sorted RID list into an accumulative RID list 550. If this is not the first semi-join that has completed, the pair-wise join runtime processor 234 invokes the sort component 244 to AND the sorted semi-join result RID list with the accumulative RID list 550 and saves the result into accumulative RID list 550. Then, the pair-wise join runtime processor 234 processes the next semi-join. This processing continues until all semi-join executions are completed or terminated. When all semi-joins are completed or terminated, the accumulative RID list 550 is the final result RID list.

The runtime optimizer 236, which may be invoked by the runtime execution processor 232, implements runtime optimization techniques for terminating and suspending semi-joins. The runtime optimizer 236 analyzes available information about the semi-joins and makes decisions about the semi-join processing. For example, the runtime optimizer 236 may invoke the index manager 240 to estimate a number of remaining RIDs for a particular semi-join. The runtime optimizer 236 may also communicate to the runtime execution processor 232 a message that all or some particular semi-join processing should be terminated or suspended.

Although certain processing was indicated as being performed by the runtime execution processor 232 and certain processing was indicated as being performed by the pair-wise join runtime processor 234, in various embodiments, various processing may be performed by the runtime execution processor 232, the pair-wise join runtime processor 234 or a combination of these processors 232, 234. Also, in some embodiments, the functionality of the runtime execution processor 232 and the pair-wise join runtime processor 234 is combined to form one component.

Additional Embodiment Details

The described operations may be implemented as a method, computer program product or apparatus using standard programming and/or engineering techniques to produce software, firmware, hardware, or any combination thereof.

Each of the embodiments may take the form of an entirely hardware embodiment, an entirely software embodiment or an embodiment containing both hardware and software elements. The embodiments may be implemented in software, which includes but is not limited to firmware, resident software, microcode, etc.

Furthermore, the embodiments may take the form of a computer program product accessible from a computer-usable or computer-readable medium providing program code for use by or in connection with a computer or any instruction execution system. For the purposes of this description, a computer-usable or computer readable medium may be any apparatus that may contain, store, communicate, propagate, or transport the program for use by or in connection with the instruction execution system, apparatus, or device.

The described operations may be implemented as code maintained in a computer-usable or computer readable medium, where a processor may read and execute the code from the computer readable medium. The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a rigid magnetic disk, an optical disk, magnetic storage medium (e.g., hard disk drives, floppy disks, tape, etc.), volatile and non-volatile memory devices (e.g., a random access memory (RAM), DRAMs, SRAMs, a read-only memory (ROM), PROMs, EEPROMs, Flash Memory, firmware, programmable logic, etc.). Current examples of optical disks include compact disk—read only memory (CD-ROM), compact disk—read/write (CD-R/W) and DVD.

The code implementing the described operations may further be implemented in hardware logic (e.g., an integrated circuit chip, Programmable Gate Array (PGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a computer readable medium at the receiving and transmitting stations or devices.

A computer program product may comprise computer useable or computer readable media, hardware logic, and/or transmission signals in which code may be implemented. Of course, those skilled in the art will recognize that many modifications may be made to this configuration without departing from the scope of the embodiments, and that the computer program product may comprise any suitable information bearing medium known in the art.

The term logic may include, by way of example, software, hardware, firmware, and/or combinations of software and hardware.

Certain implementations may be directed to a method for deploying computing infrastructure by a person or automated processing integrating computer-readable code into a computing system, wherein the code in combination with the computing system is enabled to perform the operations of the described implementations.

The logic of FIGS. 3 and 4 describes specific operations occurring in a particular order. In alternative embodiments, certain of the logic operations may be performed in a different order, modified or removed. Moreover, operations may be added to the above described logic and still conform to the described embodiments. Further, operations described herein may occur sequentially or certain operations may be processed in parallel, or operations described as performed by a single process may be performed by distributed processes.

The illustrated logic of FIGS. 3 and 4 may be implemented in software, hardware, programmable and non-programmable gate array logic or in some combination of hardware, software, or gate array logic.

Figure 6:
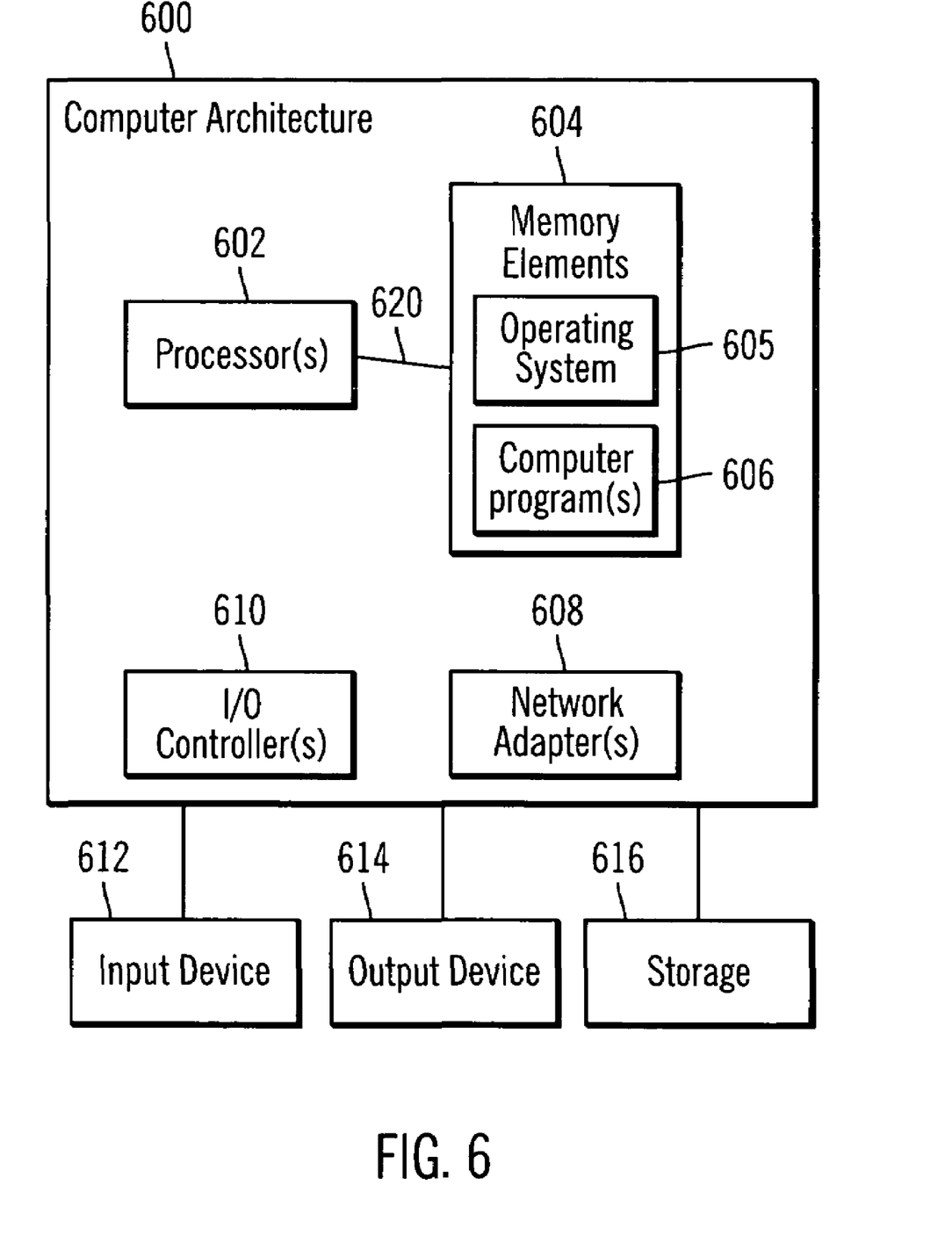
FIG. 6 illustrates an architecture of a computer system that may be used in accordance with certain embodiments.

FIG. 6 illustrates a system architecture 600 that may be used in accordance with certain embodiments. Client computer 100 and/or server computer 120 may implement system architecture 600. The system architecture 600 is suitable for storing and/or executing program code and includes at least one processor 602 coupled directly or indirectly to memory elements 604 through a system bus 620. The memory elements 604 may include local memory employed during actual execution of the program code, bulk storage, and cache memories which provide temporary storage of at least some program code in order to reduce the number of times code must be retrieved from bulk storage during execution. The memory elements 604 include an operating system 605 and one or more computer programs 606.

Input/Output (I/O) devices 612, 614 (including but not limited to keyboards, displays, pointing devices, etc.) may be coupled to the system either directly or through intervening I/O controllers 610.

Network adapters 608 may also be coupled to the system to enable the data processing system to become coupled to other data processing systems or remote printers or storage devices through intervening private or public networks. Modems, cable modem and Ethernet cards are just a few of the currently available types of network adapters 608.

The system architecture 600 may be coupled to storage 616 (e.g., a non-volatile storage area, such as magnetic disk drives, optical disk drives, a tape drive, etc.). The storage 616 may comprise an internal storage device or an attached or network accessible storage. Computer programs 606 in storage 616 may be loaded into the memory elements 604 and executed by a processor 602 in a manner known in the art.

The system architecture 600 may include fewer components than illustrated, additional components not illustrated herein, or some combination of the components illustrated and additional components. The system architecture 600 may comprise any computing device known in the art, such as a mainframe, server, personal computer, workstation, laptop, handheld computer, telephony device, network appliance, virtualization device, storage controller, etc.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the embodiments, the embodiments reside in the claims hereinafter appended or any subsequently-filed claims, and their equivalents.

What is claimed is:

1. A computer-implemented method for processing a query including semi-joins, comprising:

at execution time, for each of multiple rounds of semi-join executions, during a current round of semi-join executions, until each semi-join to be processed in the current round has been processed:

under control of a runtime execution processor, selecting a semi-join from the semi-joins for execution in the current round of semi-join executions that has not already been processed in the current round, has not been terminated in a previous round, and is not temporarily suspended for the current round, wherein an ordering of the semi-joins is based on heuristic rules that involve statistics generated from each semi-join execution; and determining a reporting threshold that indicates a number of record-identifiers to be retrieved for the selected semi-join before processing of the semi-join is stopped for the current round of semi-join executions; and under control of a pair-wise join runtime processor, executing the selected semi-join until the determined number of record identifiers are retrieved; and returning control to the runtime execution processor; and in response to determining that each of the semi-joins to be processed has been processed in the current round, terminating any semi-joins that have not been completely executed and are poorly selective, wherein the poorly selective semi-joins are ones that retrieve a high percentage of the total record-identifiers; and suspending any semi-joins for processing in a next round before beginning the next round of semi-join executions based on whether the semi-joins are expected to retrieve a large number of record-identifiers.

2. The method of claim 1, wherein the reporting threshold is a same reporting threshold for each of the semi-joins.

3. The method of claim 1, wherein the reporting threshold is different for two or more of the semi-joins.

4. The method of claim 1, wherein the reporting threshold for the semi-join changes for at least two rounds.

5. The method of claim 1, farther comprising:

in response to determining that at least one semi-join to be processed for the current round has not been processed, determining that at least two semi-joins have completed; and combining results from the at least two semi-joins.

6. The method of claim 1, wherein it is determined that all of the semi-joins that have not been completely executed are to be terminated and terminating the semi-joins that have not been completely executed.

7. The method of claim 1, further comprising:

temporarily suspending the semi-joins.

8. A computer program product comprising a computer readable storage medium including a computer readable program, wherein the computer readable program when executed by a processor on a computer causes the computer to:

at execution time, for each of multiple rounds of semi-join executions, during a current round of semi-join executions, until each semi-join to be processed in the current round has been processed:

under control of a runtime execution processor, select a semi-join from the semi-joins for execution in the current round of semi-join executions that has not already been processed in the current round, has not been terminated in a previous round, and is not temporarily suspended for the current round, wherein an ordering of the semi-joins is based on heuristic rules that involve statistics generated from each semi-join execution; and determine a reporting threshold that indicates a number of record-identifiers to be retrieved for the selected semi-join before processing of the semi-join is stopped for the current round of semi-join executions; and under control of a pair-wise join runtime processor, execute the selected semi-join until the determined number of record identifiers are retrieved; and return control to the runtime execution processor; and in response to determining that each of the semi-joins to be processed has been processed in the current round, terminate any semi-joins that have not been completely executed and are poorly selective, wherein the poorly selective semi-joins are ones that retrieve a high percentage of the total record-identifiers; and suspend any semi-joins for processing in a next round before beginning the next round of semi-join executions based on whether the semi-joins are expected to retrieve a large number of record-identifiers.

9. The computer program product of claim 8, wherein the reporting threshold is a same reporting threshold for each of the semi-joins.

10. The computer program product of claim 8, wherein the reporting threshold is different for two or more of the semi-joins.

11. The computer program product of claim 8, wherein the reporting threshold for the semi-join changes for at least two rounds.

12. The computer program product of claim 8, wherein the computer readable program when executed on a computer causes the computer to:

in response to determining that at least one semi-join to be processed for the current round has not been processed, determine that at least two semi-joins have completed; and combine results from the at least two semi-joins.

13. The computer program product of claim 8 wherein it is determined that all of the semi-joins that have not been completely executed are to be terminated and terminating the semi-joins that have not been completely executed.

14. The computer program product of claim 8, wherein the computer readable program when executed on a computer causes the computer to:

temporarily suspend the semi-joins.

15. A system for processing a query including semi-joins, comprising:

a processor; and hardware logic capable of performing operations, the operations comprising:

at execution time, for each of multiple rounds of semi-join executions, during a current round of semi-join executions, until each semi-join to be processed in the current round has been processed:

under control of a runtime execution processor, selecting a semi-join from the semi-joins for execution in the current round of semi-join executions that has not already been processed in the current round, has not been terminated in a previous round, and is not temporarily suspended for the current round, wherein an ordering of the semi-joins is based on heuristic rules that involve statistics generated from each semi-join execution; and determining a reporting threshold that indicates a number of record-identifiers to be retrieved for the selected semi-join before processing of the semi-join is stopped for the current round of semi-join executions; and under control of a pair-wise join runtime processor, executing the selected semi-join until the determined number of record identifiers are retrieved; and returning control to the runtime execution processor; and in response to determining that each of the semi-joins to be processed has been processed in the current round, terminating any semi-joins that have not been completely executed and are poorly selective, wherein poorly selective semi-joins are ones that retrieve a high percentage of the total record-identifiers; and suspending any semi-joins for processing in a next round before beginning the next round of semi-join executions based on whether the semi-joins are expected to retrieve a large number of record-identifiers.

16. The system of claim 15, wherein the reporting threshold is a same reporting threshold for each of the semi-joins.

17. The system of claim 15, wherein the reporting threshold is different for two or more of the semi-joins.

18. The system of claim 15, wherein the reporting threshold for the semi-join changes for at least two rounds.

19. The system of claim 15, wherein the operations farther comprise:

in response to determining that at least one semi-join to be processed for the current round has not been processed, determining that at least two semi-joins have completed; and combining results from the at least two semi-joins.

20. The system of claim 15, wherein it is determined that all of the semi-joins that have not been completely executed are to be terminated and terminating the semi-joins that have not been completely executed.

21. The system of claim 15, wherein the operations further comprise:

temporarily suspending the semi-joins.

* * * * *